(12) United States Patent
Yeom

(10) Patent No.: US 7,773,580 B2
(45) Date of Patent: Aug. 10, 2010

(54) APPARATUS AND METHOD FOR VOICE PROCESSING OF VOICE OVER INTERNET PROTOCOL (VOIP)

(75) Inventor: Eung-Moon Yeom, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1606 days.

(21) Appl. No.: 11/035,890

(22) Filed: Jan. 18, 2005

(65) Prior Publication Data

US 2005/0254482 A1 Nov. 17, 2005

(30) Foreign Application Priority Data

May 14, 2004 (KR) ........................ 10-2004-0034427

(51) Int. Cl.
 *H04L 12/56* (2006.01)
(52) U.S. Cl. ........................ 370/352; 370/229; 370/331; 370/356; 370/395.21; 370/401; 709/227; 709/229; 709/246
(58) Field of Classification Search ................ 370/366, 370/331, 352, 356, 401, 229, 395.21; 709/227, 709/229, 246
See application file for complete search history.

(56) References Cited

U.S. PATENT DOCUMENTS

| 6,687,245 B2 * | 2/2004 | Fangman et al. ............. 370/356 |
| 6,768,726 B2 * | 7/2004 | Dorenbosch et al. ......... 370/331 |
| 7,333,500 B2 * | 2/2008 | Roshko ......................... 370/401 |
| 7,564,834 B1 * | 7/2009 | Suder et al. ................... 370/352 |
| 2003/0118002 A1 * | 6/2003 | Bradd et al. .................. 370/352 |
| 2003/0225912 A1 * | 12/2003 | Takeda et al. ................ 709/246 |
| 2004/0249960 A1 * | 12/2004 | Hardy et al. .................. 709/229 |
| 2005/0066038 A1 * | 3/2005 | Sakamoto et al. ............ 709/227 |
| 2005/0089025 A1 * | 4/2005 | Boyer et al. .................. 370/352 |

OTHER PUBLICATIONS

*Request for Comments (RFC ) 1631 by the Network Working Group* entitled, "The IP Network Address Translator (NAT)" May 1994.
RFC 2663 "The IP Network Address Translator (NAT)" Aug. 1999.

\* cited by examiner

*Primary Examiner*—Gerald Gauthier
(74) *Attorney, Agent, or Firm*—H.C. Park & Associates, PLC

(57) ABSTRACT

An apparatus and method for voice processing of VoIP are disclosed. The method includes: allowing a call server to perform a VoIP application level gateway (ALG) function and to set a public media gateway address corresponding to a private media gateway address of the call server in a packet data unit (PDU) of a VoIP packet to perform VoIP signaling; allowing the call server to set a private signaling address in an IP header of the VoIP packet and to transmit the corresponding VoIP packet to a data server; and allowing the data server to convert the private signaling address set in the IP header of the VoIP packet received from the call server into a public signaling address and to transmit the converted address to a destination through the Internet. Since the data server does not perform the VoIP ALG function but performs only a network address translation/port translation (NAPT) task for the IP header, a task load due to correction of data set in the PDU may be omitted, so that a quality of the VoIP service may be enhanced.

14 Claims, 6 Drawing Sheets

FIG. 2

| SIGNALING IP (PRIVATE IP) | SIGNALING PORT (PRIVATE Port) | PUBLIC IP | PUBLIC PORT |
|---|---|---|---|
| 10.10.10.100 | 1720 | 100.100.100.100 | 1720 |
| 10.10.10.100 | 1719 | 100.100.100.100 | 1719 |
| 10.10.10.100 | 5060 | 100.100.100.100 | 5060 |

| MGI IP (PRIVATE IP) | MGI RTP PORT (PRIVATE PORT) | PUBLIC IP | PUBLIC PORT |
|---|---|---|---|
| 10.10.10.101 | 30000 | 100.100.100.100 | 60000 |
| 10.10.10.101 | 30001 | 100.100.100.100 | 60001 |
| ...... | 30002 ~ 30015 | ...... | 60002 ~ 60015 |
| 10.10.10.102 | 30000 | 100.100.100.100 | 60017 |
| 10.10.10.102 | 30001 | 100.100.100.100 | 60018 |
| ...... | 30002 ~ 30015 | ...... | 60019 ~ 60031 |
| 10.10.10.103 | 30000 | 100.100.100.100 | 60032 |
| 10.10.10.103 | 30001 | 100.100.100.100 | 60033 |
| ...... | 30002 ~ 30015 | ...... | 60034 ~ 60047 |

FIG. 3

| SIGNALING IP (PRIVATE IP) | SIGNALING PORT (PRIVATE Port) | PUBLIC IP | PUBLIC PORT |
|---|---|---|---|
| 20.20.20.200 | 1720 | 200.200.200.200 | 1720 |
| 20.20.20.200 | 1719 | 200.200.200.200 | 1719 |
| 20.20.20.200 | 5060 | 200.200.200.200 | 5060 |

| MGI IP (PRIVATE IP) | MGI RTP PORT (PRIVATE PORT) | PUBLIC IP | PUBLIC PORT |
|---|---|---|---|
| 20.20.20.201 | 30000 | 200.200.200.200 | 60000 |
| 20.20.20.201 | 30001 | 200.200.200.200 | 60001 |
| ...... | 30002 ~ 30015 | ...... | 60002 ~ 60015 |
| 20.20.20.202 | 30000 | 200.200.200.200 | 60017 |
| 20.20.20.202 | 30001 | 200.200.200.200 | 60018 |
| ...... | 30002 ~ 30015 | ...... | 60019 ~ 60031 |
| 20.20.20.203 | 30000 | 200.200.200.200 | 60032 |
| 20.20.20.203 | 30001 | 200.200.200.200 | 60033 |
| ...... | 30002 ~ 30015 | ...... | 60034 ~ 60047 |

S IP : SOURCE IP
D IP : DESTINATION IP
SM IP : SOURCE MEDIA GW IP
SM Port : SOURCE MEDIA GW PORT
DM IP : DESTINATION MEDIA GW IP
DM Port : DESTINATION MEDIA GW PORT

IP HESDER

VoIP PDU(PROTOCOL DATA UNIT)

APPARATUS AND METHOD FOR VOICE PROCESSING OF VOICE OVER INTERNET PROTOCOL (VOIP)

CLAIM OF PRIORITY

This application makes reference to, incorporates the same herein, and claims all benefits accruing under 35 U.S.C. §119 from an application for APPARATUS AND METHOD FOR VOICE PROCESSING OF VOICE OVER INTERNET PROTOCOL earlier filed in the Korean Intellectual Property Office on May 14, 2004 and there duly assigned Serial No. 2004-34427.

BACKGROUND OF THE INVENTION

1. Field of the Invention

The present invention relates to a Voice over Internet Protocol (VoIP) system. More particularly, the present invention relates to an apparatus and method for voice processing of VoIP capable of performing a VoIP application level gateway function (ALG) when VoIP signaling is processed in order to solve a restriction of the VoIP service according to an application of network address translation/port translation (NAT/PT, APT or NAPT) technology when a private network internally operating a private Internet protocol (IP) interacts with a public (global) network using a public IP through the NAPT.

2. Description of the Related Art

Interest in VoIP service is increasing with the high spread of Internet. The VoIP service enables telephone users to use long distance call and international call services in the Internet or Intranet environment with only a local call charge by integrating telephone services utilizing an Internet Protocol (IP) network.

A session initiation protocol (SIP), a media gateway control protocol (MGCP), H.323, and the like are defined in the VoIP.

The SIP is an application layer control protocol based on a simple text, which enables one or more participants to generate/correct/terminate sessions together with one another. The sessions include Internet teleconference, Internet telephone, Internet interview, Internet event notification, Internet instant messaging, and the like.

The MGCP is also known as 'H.248' or 'Megaco', which is a standard protocol for signal operation and session management needed while progressing a multimedia conference.

The H.323 is a standard defined in 'ITU-T' to transmit multimedia teleconference data through a network of a packet exchange type such as a TCP/IP.

Network address translation (NAT, also known as Network masquerading or IP-masquerading) is a technique used in computer networking, which relies on rewriting IP addresses of network packets passing through a router or firewall. This is merely a trick, in the sense that routers are not supposed to act in this way, however, it is still a very useful and widely used trick. Modern personal routers usually provide NAT as a core function. NAT became popular because of the IPv4 address shortage.

The NAT was proposed to solve the public IP address shortage problem by allowing a small number of public IP addresses to be used in the IP network, which is explained in the general agreement of Request for Comments (RFC) 1631 by the Network Working Group entitled "The IP Network Address Translator (NAT)" May 1994.

There are two kinds of network address translation. What is often called simply "NAT" is also sometimes named "NAT/PT," "APT" or "NAPT", and refers to network address translation involving the mapping of port numbers, allowing multiple machines to share a single IP address. The other simpler form is also called NAT, or "basic NAT" or "static NAT", and involves only address translation, not port mapping. This requires an external IP address for each simultaneous connection. The feature is often found in ADSL (Asymmetric Digital Subscriber Line) routers, sometimes labeled "DMZ host", to allow a computer to accept all external connections even when the only available external IP address is used by the router itself.

NAT with port-translation can be further distinguished to two kinds: source address translation (source NAT), where the IP address of the computer which initiated the connection is rewritten, and its counterpart: destination address translation (destination NAT).

In other words, network address translation/port translation (NAPT) technology being one of the NAT technologies is a network technology that is widely used to conceal the IP address exhaustion problem or a configuration of internal network, which is basically mounted in a router, a fire wall or the like to convert an internal private IP into a public IP that can be routed in the Internet, and to convert the port number of a TCP/UDP as well as the IP address.

When a host of a private network configured by operating a private IP wishes to communicate with a host of a global network, the host of the private network makes a communication using a private IP address assigned to the host as a source address. Since the private IP address is a meaningless address system in the global network, the private IP address should be converted into a public address in the public network. At this time, there is used a global IP address assigned for the NAPT in order to convert the address, the global IP being managed as a Pool and having one or more IP address.

A source address of the packet should be converted into a global IP address when data is externally transmitted from a private network (outgoing transmission), and a destination address of the packet should be converted into the private IP address when data is transmitted from the global network to the private network (incoming transmission).

Generally, the NAPT is performed in a router that connects a private network operating the private IP to a global network performing routing using a public IP.

The router performing the NAPT enables several hosts of the private network to share one global IP and to communicate with the global network at the same time, by supporting N:1 binding through conversion of an IP address being information on Layer 3 and port conversion of a TCP/UDP layer.

However, while the NAPT is a network address conversion method for maximizing an IP address usage rate using port information of a transport layer as well as destination address information of a network layer to make the address conversion, it is complicated and slow since an IP layer and the TCP/UDP layer should be considered to convert the IP address. Also, the NAPT has a restriction that it dose not support services (Talk, RealPlayer, and so on) sensitive to the port number without using a corresponding application level gateway (ALG).

As described in RFC 2663 "IP Network Address Translator (NAT) Terminology and Considerations", August 1999, the NAT function cannot by itself support all applications transparently and often must co-exist with application level gateways (ALGs) for this reason. People looking to deploy NAT based solutions need to determine their application requirements first and assess the NAT extensions (i.e., ALGs) necessary to provide application transparency for their environment.

Not all applications lend themselves easily to translation by NAT devices; especially those that include IP addresses and TCP/UDP ports in the payload. Application Level Gateways (ALGs) are application specific translation agents that allow an application on a host in one address realm to connect to its counterpart running on a host in different realm transparently. An ALG may interact with NAT to set up state, use NAT state information, modify application specific payload and perform whatever else is necessary to get the application running across disparate address realms.

The NAPT also has a problem in that a packet that is divided into several components to be transmitted should be reassembled in order to make to a complete packet.

Furthermore, since Internet applications such as H.323, FTP (File Transfer Protocol) and Messenger include identification information (a source address and a source port) of a packet generation host in a packet data unit (PDU) of a packet, it is not possible to support the applications in network address conversion equipment without the ALG. Accordingly, a number of ALGs are requested in order to support various Internet applications.

As such, as the NAPT is performed in the router, the router generally includes an ALG function capable of analyzing the PDU of the packet.

Accordingly, when a host of a private network generates VoIP signaling and transmits the VoIP signaling to a public network, the router converts the private IP information into the public IP information through the NAPT in an IP header of the VoIP signaling by capturing and analyzing the VoIP signaling transmitted from the corresponding host of the private network. And, the router converts source address information existing in the PDU of the VoIP signaling into the public IP address and the public port by performing the ALG function and transmits the converted information to the public network.

SUMMARY OF THE INVENTION

It is, therefore, an objective of the present invention to provide an apparatus and method for voice processing of VoIP capable of performing a VoIP application level gateway function to solve a restriction that a VoIP application level gateway (ALG) function should be equipped in a router for performing the network address translation/port translation (NAPT) when applying for NAPT technology and a problem that there occurs a post dial delay (PDD) since the VoIP ALG function is performed in the router for performing the NAPT, when a private network wishes to perform a VoIP service with a public network using a public Internet protocol (IP) in an interacting manner through the NAPT while the private network internally operates a private IP. The media gateway address includes a media gateway interface IP address and a media gateway port address According to an aspect of the present invention, an apparatus for voice processing of VoIP includes: a call server for setting a public media gateway address corresponding to a private media gateway address of the call server in a packet data unit (PDU) and setting a private signaling address in an IP (Internet Protocol) header by performing a VoIP application level gateway (ALG) function upon performing VoIP signaling; and a data server for converting the private signaling address set in the IP header by the call server into a public signaling address and transmitting the converted address through the internet.

According to another aspect of the present invention, a method for voice processing of VoIP includes: allowing a call server to perform a VoIP application level gateway (ALG) function and to set a public media gateway address corresponding to a private media gateway address of the call server in a packet data unit (PDU) of a VoIP packet to perform VoIP signaling; allowing the call server to set a private signaling address in an IP (Internet Protocol) header of the VoIP packet and to transmit the corresponding VoIP packet to a data server; and allowing the data server to convert the private signaling address set in the IP header of the VoIP packet received from the call server into a public signaling address and to transmit the converted address to a destination through the internet.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein:

FIG. 2 shows an example of an NAPT table to perform an NAPT in a first switch system;

FIG. 3 shows an example of an NAPT table for performing an NAPT in a second switch system;

DETAILED DESCRIPTION OF THE PREFERRED EMBODIMENTS

Figure 1:
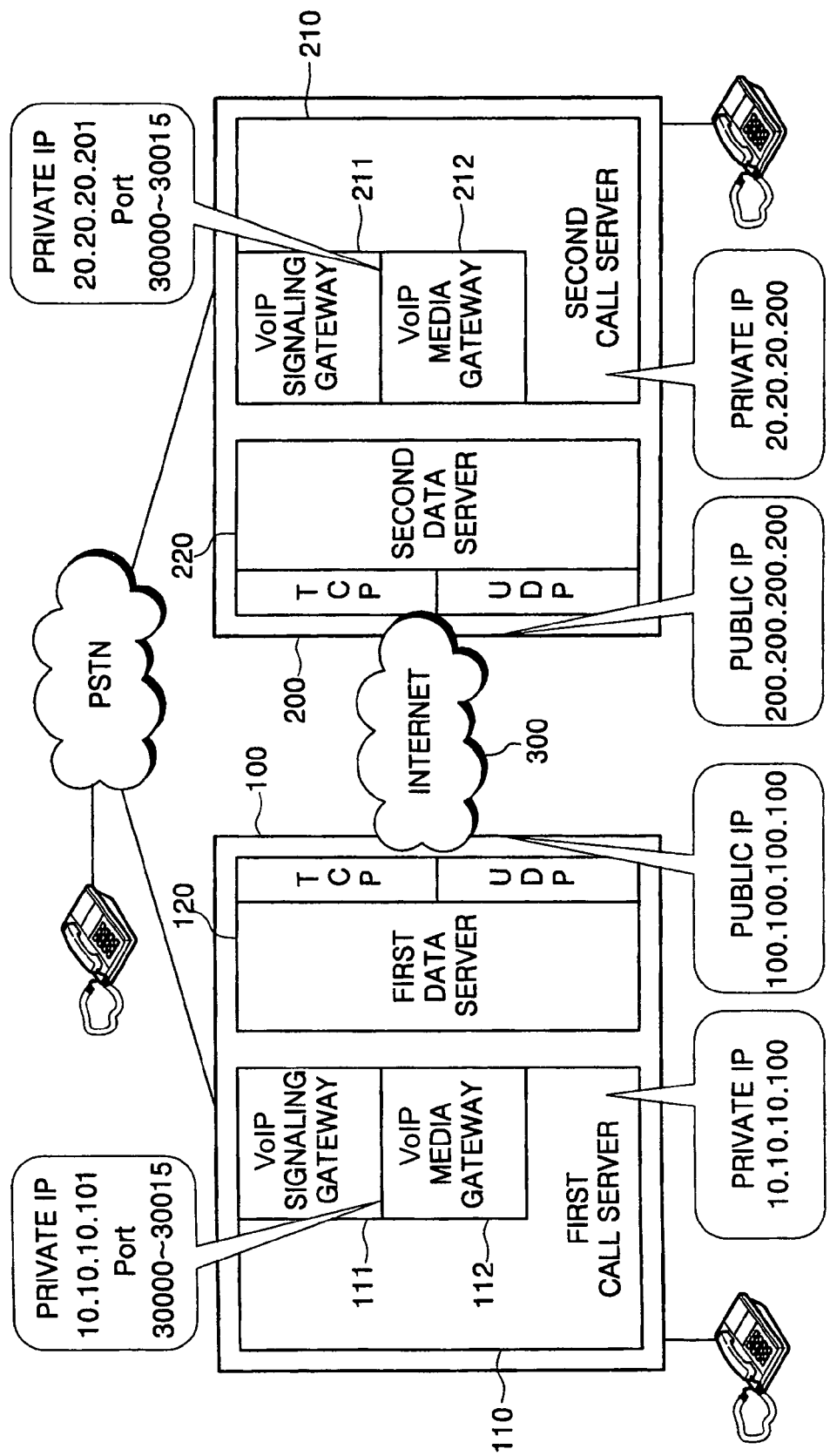
FIG. 1 is a block diagram of a VoIP system operating a private IP and a public IP.

FIG. 1 is a block diagram of a VoIP system operating a private IP and a public IP.

Referring to FIG. 1, there exist a first switch system 100 operating its own private network and communicating with an Internet network 300 using a first public IP, and a second switch system 200 operating its own private network and communicating with the Internet network 300 using a second public IP.

The first switch system 100 includes a first call server 110 that is assigned a signaling IP (a private IP address) in the first switch system 100 and performs functions of legacy call signaling and voice circuit switching for subscribers of the first switch system 100, and a first data server 120 that performs switching and routing to connect the first call server 110 to the Internet network 300. The first switch system 100 provides its own subscribers with a VoIP service.

The first data server 120 has a public IP (100.100.100.100) assigned in the Internet, and the first call server 110 also has a signaling IP (a private IP) (10.10.10.100) assigned in the first switch system. And, the first call server 110 and the first data server 120 are assigned ports to process media data in their assigned Ips.

The first call server 110 includes a VoIP signaling gateway 111 for performing a VoIP signaling process and a VoIP media gateway 112 for performing a compression conversion process of VoIP voice data.

The VoIP media gateway 112 compresses and converts voice data of each subscriber by assigning channels to each subscriber. At this time, a media gateway interface (hereinafter, referred to as an MGI) IP (a private IP) (for example, 10.10.10.101) and a private port (for example, 30000-30015) can be assigned to each channel. The MGI IP (media gateway interface IP address) and the MGI port (media gateway port address) included in a "media gateway address".

The second switch system 200 includes a second call server 210 that is assigned a signaling IP (a private IP) in the fist switch system and performs functions of legacy call signaling and voice circuit switching for subscribers of the second switch system 200 and a second data server 220 that performs switching and routing to connect the second call server 210 to the Internet network 300, and provides its subscribers with the VoIP service.

The second data server 220 has a public IP (200.200.200.200) assigned in the Internet, and the second call server 210 also has a signaling IP (a private IP) (20.20.20.200) assigned in the second switch system 200. And, the second call server 210 and the second data server 220 have ports assigned in their assigned IPs to process the media data.

The second call server 210 includes a VoIP signaling gateway 211 for performing the VoIP signaling process and a VoIP media gateway 212 for performing the compression conversion process of the VoIP voice data.

The VoIP media gateway 212 assigns a channel to each subscriber, and compresses and converts the voice data of each subscriber. At this time, an MGI IP (a private IP) (for example, 20.20.20.201) and an MGI port (a private port) (for example, 30000-30015) can be assigned to each channel. The MGI IP (media gateway interface IP address) and the MGI port (media gateway port address) included in a "media gateway address".

As such, when the subscriber wishes to use the VoIP service through a private IP terminal in the IP network, the first call server 110 generates a call connection request message according to telephone number information input by a user and transmits the message to the first data server 120. The first data server 120 receives the call connection request message transmitted from the first call server 110, converts a source IP address to a corresponding public IP address of the private IP address, and transmits the converted address to the first data server 220 of a private network of the other party through the Internet 300. And, when the private IP terminal of the other party responds to the call connection request message, a call is connected between the private IP terminal in the first switch system 100 and the private IP terminal in the second switch system 200, so that voice communication is performed according to the VoIP.

In order that the first call server 110, having the private IP, forms a session with the second call server 210, having the private IP, in the VoIP system operating the private IP and the public IP and performs a communication, an NAPT (network address translation/port translation) needs to be performed.

Such NAPT is performed in the data servers 120 and 220 when performing a routing function.

When the VoIP signaling gateway 111 and VoIP media gateway 112 of the first call server 110 generate VoIP packets, the VoIP signaling gateway 111 and VoIP media gateway 112 load their signaling IP addresses and signaling port addresses in IP headers as source addresses, and their MGI IP addresses and media gateway interface (MGI) real time protocol (RTP) port addresses in the PDU (packet data unit) as the source addresses.

Accordingly, when a packet is transmitted from the first call server 110 to a destination address through the first data server 120 by way of the Internet network, the first data server 120 performs a task of converting the signaling IP addresses and signaling port addresses loaded in the IP header of the corresponding packet by the first call server 110 into the public IP address and public port address and transmitting them through the Internet.

The first data server 120 performs tasks of converting the MGI IP address and MGI RTP port address loaded in the PDU by the first call server 110 into the public IP address and public port address by performing the VoIP ALG function and transmitting them through the Internet.

When an arbitrary packet is received in the first switch system through the Internet 300, the first data server 120 converts the public IP set in the IP header of the corresponding packet as the destination address into the private IP in the first switch system and transmits it to a corresponding subscriber.

When the VoIP signaling gateway 211 and the VoIP media gateway 212 of the second call server 210 generate the VoIP packet, the VoIP signaling gateway 211 and the VoIP media gateway 212 load their signaling IP addresses and signaling port addresses in the IP header as source addresses, and their MGI IP addresses and MGI RTP port addresses in the PDU as the source addresses.

Accordingly, when a packet is transmitted from the second call server 210 to a destination address through the second data server 220 by way of the Internet network, the second data server 220 performs a task of converting the signaling IP addresses and signaling port addresses loaded in the IP header of the corresponding packet by the second call server 210 into the public IP address and public port address and transmitting them through the Internet.

The second data server 220 performs tasks of converting the MGI IP address and MGI RTP port address loaded in the PDU by the second call server 210 into the public IP address and public port address by performing the VoIP ALG function and transmitting them through the Internet.

When an arbitrary packet is received in the second switch system through the Internet 300, the second data server 220 converts the public IP set in the IP header of the corresponding packet as the destination address into the private IP in the second switch system and transmits it to a corresponding subscriber.

Accordingly, the data servers 120 and 220 refer to an NAPT table in order to perform the NAPT.

FIG. 2 shows an example of an NAPT table to perform an NAPT in a first switch system 100.

Referring to FIG. 2, the NAPT table is largely divided into a data area loaded in an IP header, and a data area loaded in a PDU.

First, on reviewing the data area loaded in the IP header, there exist a signaling IP (10.10.10.100) assigned to the first call server 110, a signaling port (a private port) (1720, 1719 and 5060), a public IP (100.100.100.100) with respect to each private IP, and a public port (1720, 1719 and 5060) with respect to each private port.

On reviewing the data area loaded in the PDU, there exist an MGI IP (a private IP) (10.10.10.101, 10.10.10.102 and 10.10.10.103) assigned to a media gateway of the first call server 110, and an MGI RTP port (a private port) (30000-30015) with respect to each MGI IP. Sixteen (16) ports are assigned with respect to one MGI IP. And, there exist a public IP (100.100.100.100) with respect to each private IP, and a public port (60000-60047) with respect to each private port.

FIG. 3 shows an example of an NAPT table for performing an NAPT in a second switch system 200.

Referring to FIG. 3, the NAPT table is largely divided into a data area loaded in an IP header and a data area loaded in a PDU.

First, on reviewing the data area loaded in the IP header, there exist a signaling IP (a private IP) (20.20.20.200) assigned to the second call server 210, a signaling port (a private port) (1720, 1719 and 5060), a public IP (200.200.200.200) with respect to each private IP, and a public port (1720, 1719 and 5060) with respect to each private port.

On reviewing the data area loaded in the PDU, there exist an MGI IP (a private IP) (20.20.20.201, 20.20.20.202 and 20.20.20.203) assigned to a media gateway of the second call server 210, and an MGI RTP port (a private port) (30000-30015) with respect to each MGI IP. Sixteen (16) ports are assigned with respect to one MGI IP. And, there exist a public IP (200.200.200.200) with respect to each private IP, and a public port (60000-60047) with respect to each private port.

Figure 4:
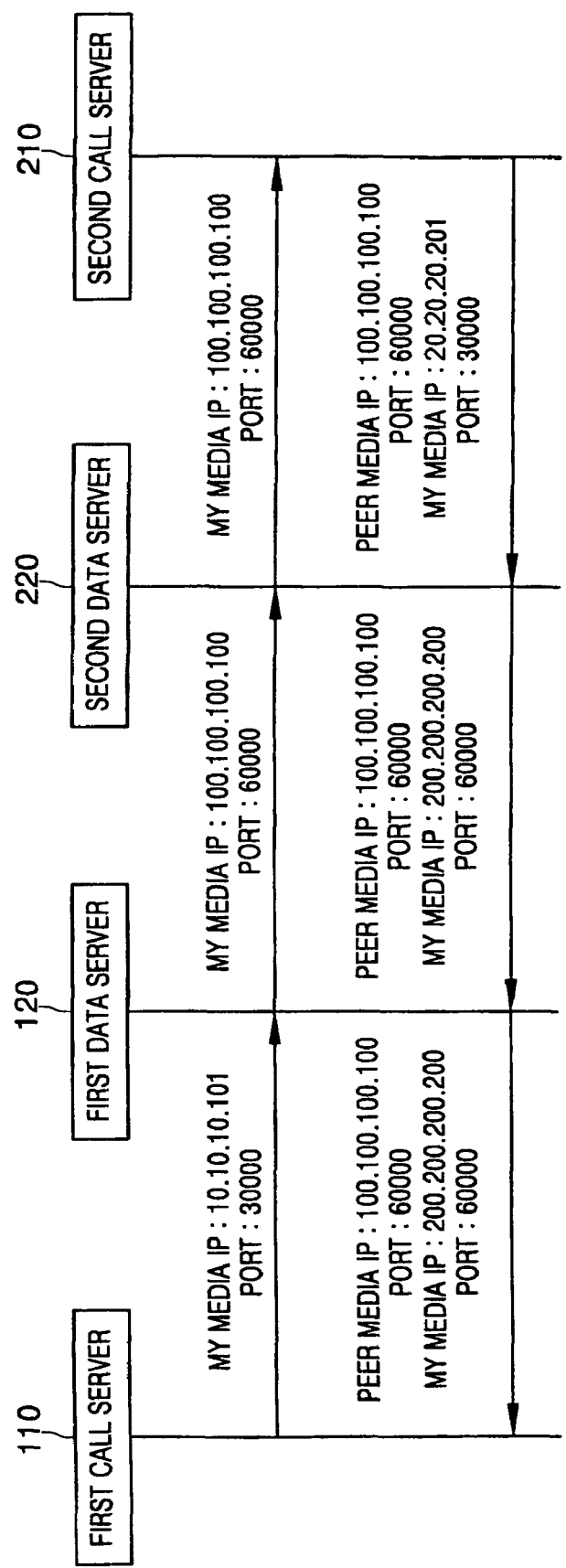
FIG. 4 is a flow chart illustrating an example of performing a VoIP ALG function with respect to data loaded in a PDU in a data server.

FIG. 4 is a flow chart illustrating an operation to perform a VoIP ALG function with respect to data loaded in a PDU (packet data unit) in a first data server 120 and a second data server 220.

A process will be explained with reference to FIG. 4, where a first call server transmits a setup message to a second call server and receives a connection message from the second call server. At this time, a reference will be made to the NAPT table shown in FIGS. 2 and 3.

As shown in FIG. 4, the first call server 110 loads in a PDU its MGI IP address: 10.10.10.101 and its MGI port address: 30000 and transmits them to the first data server 120. The first data server 120 converts the MGI IP address: 10.10.10.101 and MGI port address: 30000 set in the PDU into an MGI IP address: 100.100.100.100 of a public IP and an MGI port address: 60000 of a public port with reference to the table of FIG. 2, and transmits them to the second data server 220. The second data server 220 transmits the MGI IP address: 100.100.100.100 of a public IP and the MGI port address: 60000 of a public port that are received from the first data server 120 to the second call server 210 without any conversion.

For that, the second call server 210 sets the MGI IP address: 100.100.100.100 and MGI port address: 60000 as a destination address and its MGI IP address: 20.20.20.201 and its MGI port address: 30000 as a source address in the PDU, and transmits them to the second data server 220. The second data server 220 converts the MGI IP address: 20.20.20.201 and MGI port address: 30000 set in the PDU into the MGI IP address: 200.200.200.200 of a public IP and the MGI port address: 60000 of a public port with reference to the table of FIG. 3 and transmits them to the first data server 120. The first data server 120 transmits the MGI IP address: 100.100.100.100 of a destination address and the MGI port address: 60000 of a public port, and the MGI IP address: 200.200.200.200 and the MGI port address: 60000 of a public port that are received from the second data server 220, to the first call server 110 without any conversion.

On reviewing the above process, it can be understood that a task is being preformed, where a private MGI IP and a private MGI port set in the PDU by performing a VoIP ALG function in the first data server 120 and the second data server 220 are converted into the public MGI IP and MGI port with reference to each NAPT table.

However, as a task is performed where a data server performing routing with respect to a VoIP packet transmitted in a host of a private network performs an ALG (Application Level Gateway) function and converts source address information stored in the PDU of the VoIP packet into the public IP address and public port, a post dial delay (PDD) occurs in the process of capturing and analyzing the VoIP packet and reassembling the VoIP message, so that there occurs an obstacle to the VoIP service.

In the case of some application protocols requiring the ALG function, the ALG function is necessarily required in the data server performing the router function in order that the private network operating the private IP performs the NAPT, and so it becomes an obstacle to the VoIP service.

The present invention will now be further described more fully hereinafter with additional reference to the accompanying drawings, in which a preferred embodiment of the invention is shown. This invention may, however, be embodied in different forms and should not be construed as limited to the embodiment set forth herein. Rather, the embodiment is provided so that this disclosure will be thorough and complete, and will fully convey the scope of the invention to those skilled in the art.

In order to explain an operation to perform a VoIP application level gateway (ALG) function in accordance with the present invention, the VoIP system for performing the VoIP ALG function in accordance with the present invention will be further explained with reference to FIGS. 1-6.

As shown in FIG. 1, the VoIP system for performing a VoIP ALG function in accordance with the present invention includes first switch system 100 for operating its own private network and communicating with Internet network 300 using a first public Internet protocol (IP) and second switch system 200 for operating its own private network and communicating with Internet network 300 using a second public IP.

The first switch system 100 includes a first call server 110 that is assigned a signaling IP (a private IP address) in the first switch system and performs functions of legacy call signaling and voice circuit switching for subscribers of the first switch system 100 and a first data server 120 that performs switching and routing to connect the first call server 110 to the Internet network 300, and first switch system 100 provides its subscribers with VoIP service.

The first data server 120 has a public IP (100.100.100.100) assigned in the Internet, and the first call server 110 also has a signaling IP (a private IP) (10.10.10.100) assigned in the first switch system 100. And, the first call server 110 and the first data server 120 are assigned ports for processing media data in their assigned Ips.

The first call server 110 includes a VoIP signaling gateway 111 for performing a VoIP signaling process and a VoIP media gateway 112 for performing a compression conversion process of VoIP voice data.

The VoIP media gateway 112 compresses and converts voice data of each subscriber by assigning channels to each subscriber. At this time, a MGI IP (a private IP) (for example, 10.10.10.101) and a private port (for example, 30000-30015) can be assigned with respect to each channel. A "media gateway address" includes the MGI IP address and the MGI port address.

The second switch system 200 includes a second call server 210 that is assigned a signaling IP (a private IP) in the fist switch system 100 and performs functions of legacy call signaling and voice circuit switching for the subscribers of the second switch system 200 and a second data server 220 that performs the switching and routing to connect the second call server 210 to the Internet network 300, and provides its subscribers with the VoIP service.

According to the invention, the second data server 220 has one router IP (200.200.200.200) assigned in the Internet, and the second call server 210 also has one signaling IP (a private IP) (20.20.20.200) assigned in the second switch system 200. And, the second call server 210 and the second data server 220 are assigned ports used to process media data in their assigned IPs.

The second call server 210 includes VoIP signaling gateway 211 for performing the VoIP signaling process and VoIP media gateway 212 for performing the compression conversion of VoIP voice data.

The VoIP media gateway 212 assigns channels to each subscriber and compresses and converts voice data of each subscriber. At this time, an MGI IP (a private IP) (for example, 20.20.20.201) and an MGI port (a private port) (for example, 30000-30015) can be assigned with respect to each channel. A "media gateway address" includes the MGI IP address and the MGI port address.

As such, in order that call server 110, having a private IP, forms a session with call server 210, having a private IP, and communicates with call server 210 in the VoIP system operating the private IP and public IP, an network address translation/port translation (NAPT) is needed.

In accordance with the present invention, the NAPT is performed in data servers 120 and 220, when performing a routing function, with respect to the IP header and in call servers 110 and 210 through a VoIP ALG function with respect to a packet data unit (PDU).

When VoIP signaling gateway 111 and VoIP media gateway 112 of call server 110 generate a VoIP packet, VoIP signaling gateway 111 and VoIP media gateway 112 load their signaling IP addresses and signaling port addresses in the IP header as source addresses, and load public MGI IP addresses and public MGI port addresses corresponding to their private MGI IP addresses and MGI real time protocol (RTP) port addresses in the PDU as the source addresses by performing the VoIP ALG function with reference to the table shown in FIG. 2.

Accordingly, when a packet is transmitted from call server 110 to a destination address through data server 120 by way of the Internet network, data server 120 performs tasks of converting the signaling IP addresses and signaling port addresses, loaded in the IP header of the corresponding packet by call server 110, into the public IP address and public port address and transmitting the corresponding packet through the Internet without performing the VoIP ALG function for the data loaded in the PDU.

When an arbitrary packet is received in the first switch system 100 through the Internet 300, data server 120 converts the public IP and public port set in the IP header of the corresponding packet as a destination address into the private IP in the first switch system 100 and transmits the corresponding packet to the corresponding subscriber.

Also, when the VoIP signaling gateway 211 and the VoIP media gateway 212 of call server 210 generate the VoIP packet, the VoIP signaling gateway 211 and the VoIP media gateway 212 load their signaling IP addresses and signaling port addresses as source addresses in the IP header, and public MGI IP addresses and public MGI port addresses corresponding to their private MGI IP addresses and MGI RTP port addresses as the source addresses in the PDU by performing the VoIP ALG function with reference to the table as shown in FIG. 3.

Accordingly, when a packet is transmitted from call server 210 to a destination address through data server 220 by way of the Internet network, data server 220 performs tasks of converting the signaling IP addresses and signaling port addresses, loaded in the IP header of the corresponding packet by call server 210, to the public IP addresses and public port addresses, and transmitting the corresponding packet through the Internet without performing the VoIP ALG function of the data loaded in the PDU.

When an arbitrary packet is received in the second switch system through the Internet 300, data server 220 converts the public IP and public port set in the IP header of the corresponding packet as destination addresses into the private IP in the second switch system 200 and transmits the corresponding packet to the corresponding subscriber.

As such, with reference to the NAPT tables shown in FIGS. 2 and 3, call servers 110 and 210 convert their private MGI IP addresses and MGI port addresses into the public MGI IP addresses and MGI port addresses by performing the VoIP ALG function and set them in the PDU, and data servers 120 and 220 convert the private signaling IP addresses and port addresses set in the IP header into the public IP address and public port address.

Figure 5:
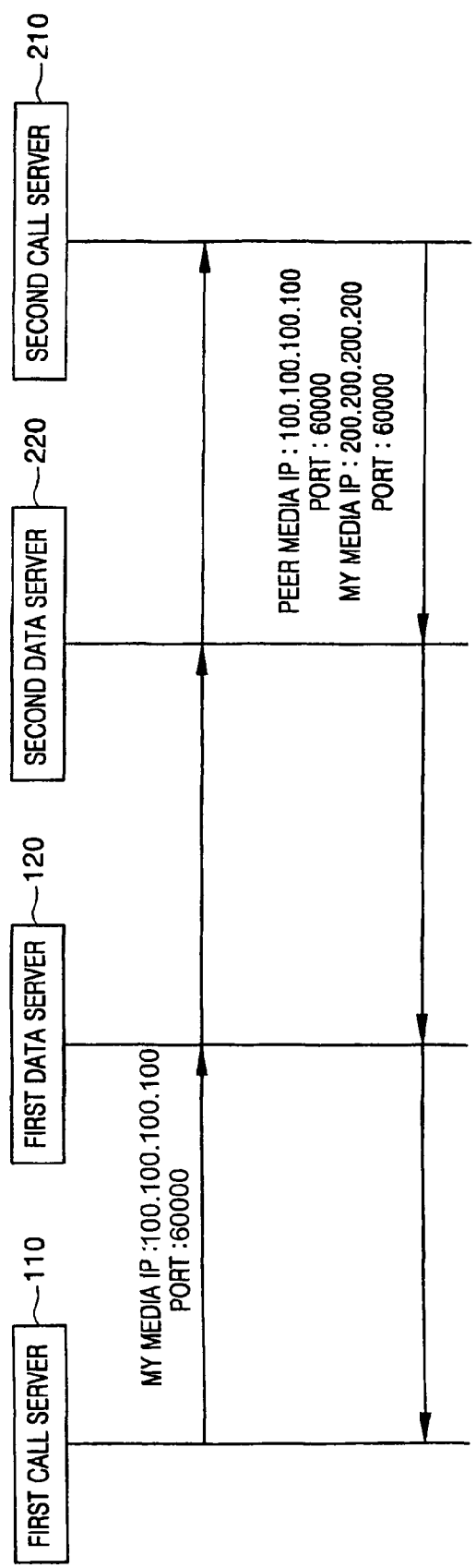
FIG. 5 is a flow chart illustrating an operation to perform a VoIP ALG function with respect to data loaded in a PDU in a call server in accordance with the principles of the present invention.

FIG. 5 is a flow chart illustrating an operation of performing a VoIP ALG function with respect to data loaded in a PDU in call servers 110 and 210 by performing the VoIP ALG function in accordance with the present invention.

A process will be explained with reference to FIG. 5, where call server 110 transmits a setup message to call server 210 and receives a connection message from call server 210. At this time, the explanation will be given with reference to the NAPT tables shown in FIGS. 2 and 3.

As shown in FIGS. 2, 3 and 5, call server 110 loads a public MGI IP address of 100.100.100.100 and a public MGI port address of 60000, corresponding to its private MGI IP: 10.10.10.101 and MGI port: 30000, in a PDU by performing the VoIP ALG function, and transmits them to data server 120. Data server 120 transmits the MGI IP: 100.100.100.100 and the MGI port: 60000 set in the PDU, without any additional task with respect to the PDU, to data server 220 without any conversion by not performing the VoIP ALG function with respect to the PDU but performing an NAPT with respect to the signaling IP and port in the IP packet. Data server 220 transmits the MGI IP: 100.100.100.100 and the MGI port: 60000 of a public port received from data server 120 to call server 210 without any conversion.

Call server 210 sets the MGI IP: 100.100.100.100 and the MGI port: 60000 in the PDU as a destination addresses, and transmits the public MGI IP address of 200.200.200.200 and the public MGI port address of 60000, corresponding to its private MGI IP: 20.20.20.201 and MGI port: 30000, as the source addresses in the PDU to data server 220 by performing the VoIP ALG function with reference to the table shown in FIG. 3.

Data server 220 transmits the MGI IP: 100.100.100.100 and the MGI port: 60000 of the destination addresses and the public MGI IP address of 200.200.200.200 and the public MGI port address of 60000 of the source addresses set in the PDU to data server 120, without any additional task with respect to the PDU, by not performing the VoIP ALG function with respect to the PDU but performing the NAPT with respect to the signaling IP and port in the IP packet. Data server 120 transmits the MGI IP: 100.100.100.100 and the MGI port: 60000 of the destination address and the public MGI IP address of 200.200.200.200 and the public MGI port address of 60000, of the source addresses received from data server 220, to call server 110 without any conversion.

On reviewing this process, call server 110 and call server 210 convert their private MGI IP and private MGI port into the public MGI IP and the public MGI port with reference to each NAPT table by performing the VoIP ALG function, and load them in the PDU. And, then call servers 110 and 210 generate packets and transmit the generated packets to data server 120 and data server 220, respectively. Accordingly, in the case of transceiving the VoIP packet to and from call servers 110 and 210 existing in different private networks, since it is not necessary to implement the VoIP ALG function in the first data server 120 and the second data server 220, a post dial delay (PDD) occurring in the course of capturing and analyzing the VoIP packet and reassembling the VoIP message in data servers 120 and 220 upon performing the VoIP service does not occur any more, so that the quality of the VoIP service can be enhanced.

Figure 6:
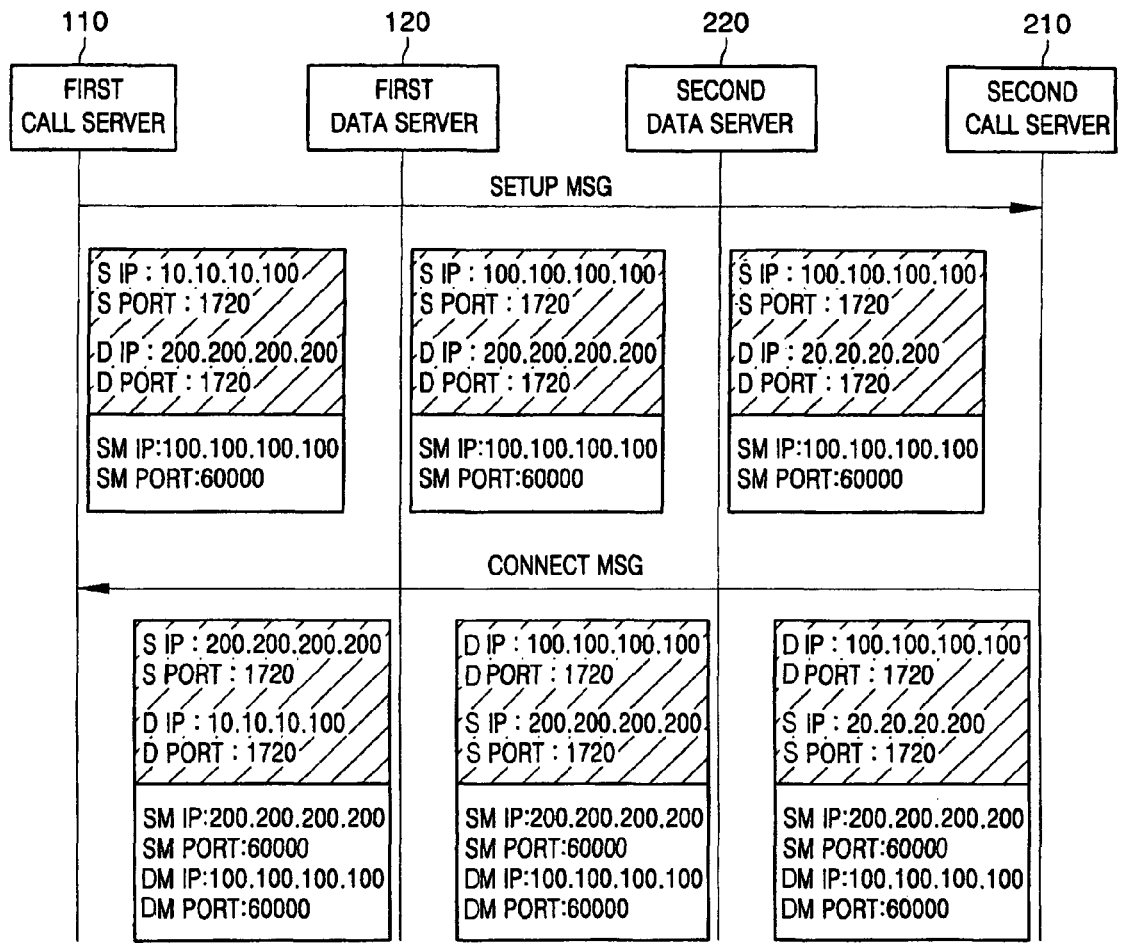
FIG. 6 is a flow chart illustrating an operation to perform an NAPT function with respect to an IP header and a VoIP ALG function with respect to a PDU in accordance with the principles of the present invention.
Figure 6:
Figure 6:

FIG. 6 is a flow chart illustrating an operation to perform an NAPT function with respect to an IP header and a VoIP ALG function with respect to a PDU in accordance with the present invention.

Referring to FIG. 6, S IP denotes a Source IP, D IP denotes a Destination IP, SM IP denotes a Source Media gateway IP, SM Port denotes a Source Media gateway Port, DM IP denotes a Destination Media gateway IP, and DM Port denotes a Destination Media gateway Port.

A process will be explained with reference FIGS. 1 and 6, where call server 110 transmits a setup message to call server 210, and receives a connection message from call server 210. At this time, the explanation will be given with reference to the NAPT tables shown in FIGS. 2 and 3.

Referring to FIGS. 1, 2, 3 and 6, when call server 110 generates a VoIP packet through VoIP signaling gateway 111 and VoIP media gateway 112, call server 110 loads its signaling IP address (10.10.10.100) and signaling port address (1720) in the IP header as source addresses (S IP and S Port), and loads a public IP address (200.200.200.200) and a public port address (1720) of the second switch system in the IP header as destination IP addresses (D IP and D Port).

Call server 110 also loads the public MGI IP address of 100.100.100.100 and the public MGI port address of 60000, corresponding to its private MGI IP: 10.10.10.101 and MGI port: 30000, in the PDU as its source media addresses (SM IP and SM Port) by performing the VoIP ALG function with reference to the table shown in FIG. 2, and generates the packet. Call server 110 then transmits the packet generated described above to data server 120.

When data server 120 receives the packet from call server 110, it does not perform the VoIP ALG function with respect to the PDU but performs the NAPT function with respect to the signaling IP and port of the source addresses (S IP and S Port) in the IP packet. Accordingly, when transmitting to data server 220, data server 120 converts the S IP address (10.10.10.100) and the S Port address (1720) into S IP address (100.100.100.100) and the S Port address (1720) with reference to the table shown in FIG. 2, and maintains the D IP address (200.200.200.200) and the D Port address (1720) of the second switch system.

At this time, data server 120 also transmits the SM IP: 100.100.100.100 and SM Port: 60000 set in the PDU to data server 220 without any additional task with respect to the PDU since it does not perform the VoIP ALG function with respect to the PDU.

Data server 220 converts the packet received from data server 120 into the D IP: 20.20.20.200 and D Port: 1720 with reference to the table shown in FIG. 3 and transmits them to call server 210 in order to maintain the S IP: 100.100.100.100 and S Port: 1720 set in the IP header with respect to the packet received from the first data server 120 without any conversion and convert the D IP: 200.200.200.200 and D Port: 1720 into the private IP and port in the second switch system.

At this time, data server 220 transmits the SM IP: 100.100.100.100 and SM Port: 60000 set in the PDU with respect to the packet received from data server 120 without any conversion to call server 210.

Accordingly, call server 210 transmits the corresponding packet to a subscriber terminal having the private IP: 20.20.20.200 and the private Port: 1720 set in the IP header.

Meanwhile, when the VoIP packet is generated through VoIP signaling gateway 211 and VoIP media gateway 212, in order to transmit a connect message with respect to a setup message of call server 110, call server 210 loads its signaling IP address (20.20.20.200) and signaling port address (1720) in the IP header as its source addresses (S IP and S Port), and the public IP address (100.100.100.100) and the public port address (1720) received from call server 110 of the first switch system as the destination IP addresses (D IP and D Port).

Call server 210 sets the SM IP: 100.100.100.100 and the SM Port: 60000 received from the call server 110 of the first switch system in the PDU as the destination media addresses (DM IP and DM Port), and transmits the public MGI IP address of 200.200.200.200 and the public MGI port address of 60000, corresponding to its private MGI IP: 20.20.20.201 and MGI port: 30000, in the PDU as the source media addresses (SM IP and SM Port) to data server 220 with reference to the table shown in FIG. 3 by performing the VoIP ALG function.

As data server 220 performs the NAPT function, with respect to only the source IP and source port addresses (S IP and S Port) set in the IP header, for converting the S IP address (20.20.20.20) and the S Port address (1720) into a public S IP address (200.200.200.200) and a public port address (1720) with reference to the table shown in FIG. 3, and maintaining the public D IP address (100.100.100.100) and the public D Port address (1720) of the first switch system without any conversion.

At this time, since data server 220 does not perform the VoIP ALG function with respect to the PDU, it transmits the DM IP: 100.100.100.100 and the DM Port: 60000 of the destination addresses and the SM IP: 200.200.200.200 and the SM Port: 60000 of the source addresses set in the PDU received from the second data server 220 to data server 120 without any additional task with respect to the PDU.

Data server 120 maintains the addresses S IP: 200.200.200.200 and S Port: 1720 set in the IP header without any conversion and converts the addresses D IP: 100.100.100.100 and D Port: 1720 into the D IP: 10.10.10.100 and D Port: 1720 with reference to the table shown in FIG. 2 in order to convert the D IP: 100.100.100.100 and D Port: 1720 into the private IP and port in the first switch system, and transmits the D IP: 10.10.10.100 and D Port: 1720 to call server 110.

At this time, data server 120 transmits the DM IP: 100.100.100.100 and DM Port: 60000 of the destination addresses and the SM IP: 200.200.200.200 and SM Port: 60000 of the source addresses set in the PDU for the packet received from data server 220, without any conversion, to call server 110.

Accordingly, call server 110 transmits the corresponding packet to the subscriber terminal having the private IP address: 10.10.10.100 and private Port address: 1720 set in the IP header.

On reviewing the entire process as described above, it can be seen that upon generating the VoIP packet, call server 110 sets its private IP address and private port address in the IP header, and its private MGI IP and private MGI port in the PDU after converting them into the public MGI IP and MGI port with reference to each NAPT table by performing the VoIP ALG function.

Accordingly, it can be seen that information set in the PDU of the packet does not give any burden on data server 120 or data server 220 since there is no correction task on data server 120 or data server 220 for information set in the PDU of the corresponding packet while the packet generated in call server 110 reaches call server 210 of the second switch system.

That is, when call server 110 and call server 210, existing in different private networks, transmit the VoIP packet, since data servers 120 and 220 do not need to implement the VoIP ALG function to convert information set in the PDU of the packet, there occurs no PDD (Post Dial Delay) any more, which may be occurred in the process of capturing and analyzing the VoIP and reassembling the VoIP message in data servers 120 and 220 upon performing the VoIP service.

According to the present invention, when a first call server of a first switch system transmits a setup message to a second switch system for an VoIP service, it sets a public media gateway interface IP address and a public media gateway interface port address corresponding to its private media gateway interface IP address and private media gateway interface port address in a PDU of the VoIP packet with reference to an NAPT table of the first switch system and transmits the set addresses to an Internet network through the first data server.

The first data server converts only private signaling IP address and private signaling port address set in an IP header of a corresponding setup message into a public IP and a public port with reference to an NAPT table without performing a VoIP ALG function, and then transmits the converted addresses to the second switch system.

Meanwhile, when a second call server of the second switch system transmits a connection message corresponding to the setup message received from the first switch system to the first switch system, it sets a public media gateway interface IP address and a public media gateway interface port address corresponding to its private media gateway interface IP address and private media gateway interface port address in the PDU of the VoIP packet with reference to an NAPT table of the second switch system, and then transmits them to the Internet network through the second data server.

The second data server converts only private signaling IP address and private signaling port address set in an IP header of the corresponding setup message into the public IP and public port with reference to the NAPT table without performing the VoIP ALG function, and then transmits them to the first switch system.

And then, when the first switch system transmits voice data to the second switch system using a public IP address and a public port address of the second switch system obtained through a signaling process upon transmitting the voice data after transcoding the voice data, and the data server performing routing of the second switch system makes conversion of the IP header with reference to the NAPT table and transmits it to the corresponding private IP address and the corresponding private port address.

As described above, since the data servers of the first and second switch systems do not perform the VoIP ALG function, but perform only an NAPT task for the IP header to provide the VoIP service in the courses of signaling and voice data transcoding, a task load due to correction of data set in the PDU may be omitted and a quality of the VoIP service may be enhanced.

Although preferred embodiments of the present invention have been described, it will be understood by those skilled in the art that the present invention should not be limited to the described preferred embodiments. Rather, various changes and modifications can be made within the spirit and scope of the present invention, as defined by the following claims.

What is claimed is:

1. An apparatus for voice processing of VoIP (Voice over Internet Protocol), comprising:
    a call server to set a public media gateway address corresponding to a private media gateway address of the call server in a packet data unit (PDU) and to set a private signaling address in an Internet protocol (IP) header by executing a VoIP application level gateway (ALG) function in response to performing VoIP signaling; and
    a data server to convert the private signaling address set in the IP header by the call server into a public signaling address and to transmit the converted address through an Internet.

2. The apparatus according to claim 1, wherein the call server refers to a network address translation/port translation (NAPT) table to execute the VoIP application level gateway (ALG) function.

3. The apparatus according to claim 2, wherein the network address translation/port translation (NAPT) table is referred to by the data server in order that the data server makes an address conversion in the IP header.

4. The apparatus according to claim 1, wherein the private media gateway address comprises a private media gateway interface IP address and a private media gateway port address, and the corresponding public media gateway address comprises a public media gateway interface IP address and a public media gateway port address.

5. The apparatus according to claim 1, wherein the signaling address comprises a signaling IP address and a signaling port address.

6. The apparatus according to claim 1, wherein the call server sets a public media gateway address corresponding to private media gateway address information of the call server as a source address and a public media gateway address received through the Internet as a destination address, in the packet data unit (PDU), and sets a private signaling address of the call server as the source address and a public signaling address received through the Internet as the destination address through the Internet in the IP header, by executing the VoIP application level gateway (ALG) function in response to performing the VoIP signaling.

7. The apparatus according to claim 1, wherein, when the public signaling address is set as a destination address in the IP header of the VoIP packet received through the Internet in response to performing the VoIP signaling, the data server converts the public signaling address into a private signaling address of the data server corresponding to the public signaling address, sets the converted address, and transmits the converted address to the call server.

8. A method for voice processing of VoIP (Voice over Internet Protocol), comprising:
    executing, using a call server, a VoIP application level gateway (ALG) function and to set setting, using the call server, a public media gateway address corresponding to a private media gateway address of the call server in a packet data unit (PDU) of a VoIP packet to perform VoIP signaling;
    setting, using the call server, a private signaling address in an Internet protocol (IP) header of the VoIP packet and transmitting, using the call server, the corresponding VoIP packet to a data server; and
    converting, using the data server, the private signaling address set in the IP header of the VoIP packet received from the call server into a public signaling address and transmitting, using the data server, the converted address to a destination through an Internet.

9. The method according to claim 8, wherein the call server refers to a network address translation/port translation (NAPT) table to execute the VoIP application level gateway (ALG) function.

10. The method according to claim 9, further comprising converting an address in the IP header by referring to the NAPT table using the data server.

11. The method according to claim 8, wherein the private media gateway address comprises a private media gateway interface IP address and a private media gateway port address, and the corresponding public media gateway address comprises a public media gateway interface IP address and a public media gateway port address.

12. The method according to claim 8, wherein the signaling address comprises a signaling IP address and a signaling port address.

13. The method according to claim 8, further comprising:
setting, using the call server, a public media gateway address corresponding to private media gateway address information of the call server as a source address and setting a public media gateway address received through the Internet as a destination address in the packet data unit (PDU) by executing the VoIP application level gateway (ALG) function in response to performing the VoIP signaling; and
setting, using the call server, a private signaling address of the call server as a source address and setting a public signaling address received through the Internet as a destination address through the Internet in the IP header.

14. The method according to claim 8, further comprising, when a public signaling address is set in the IP header of the VoIP packet received through the Internet as the destination address through the Internet in response to performing the VoIP signaling, by the data server, converting the public signaling address into a private signaling address of the data server corresponding to the public signaling address, setting the converted private signaling address, and transmitting the private signaling address to the call server.

* * * * *